(12) United States Patent
Pelini (10) Patent No.: US 10,220,926 B1
(45) Date of Patent: Mar. 5, 2019

(54) BREAKAWAY AND HYDRAULIC LIFT JACK PLATE

(71) Applicant: Mark F. Pelini, Valrico, FL (US)

(72) Inventor: Mark F. Pelini, Valrico, FL (US)

( * ) Notice: Subject to any disclaimer, the term of this patent is extended or adjusted under 35 U.S.C. 154(b) by 0 days.

(21) Appl. No.: 15/934,487

(22) Filed: Mar. 23, 2018

Related U.S. Application Data (63) Continuation-in-part of application No. 15/820,066, filed on Nov. 21, 2017, and a continuation-in-part of application No. 15/858,766, filed on Dec. 29, 2017.

(51) Int. Cl.
| | | |
|---|---|---|
| *B63H 20/10* | (2006.01) | |
| *B63H 20/06* | (2006.01) | |
| *B63H 5/125* | (2006.01) | |
| *B60S 9/02* | (2006.01) | |
| *B60D 1/66* | (2006.01) | |

(52) U.S. Cl.
CPC ............ *B63H 20/10* (2013.01); *B63H 5/125* (2013.01); *B63H 20/06* (2013.01); *B60D 1/66* (2013.01); *B60S 9/02* (2013.01)

(58) Field of Classification Search
CPC ......... B63H 20/10; B63H 20/06; F15B 11/10; F15B 2211/20515
USPC ................................. 248/640, 641, 642, 643
See application file for complete search history.

(56) References Cited

U.S. PATENT DOCUMENTS

| | | | | | |
|---|---|---|---|---|---|
| 5,782,662 | A * | 7/1998 | Icenogle | .............. | B63H 20/106 248/641 |
| 5,964,627 | A * | 10/1999 | Detwiler | .............. | B63H 20/106 440/58 |
| 6,305,996 | B1 * | 10/2001 | Detwiler | .............. | B63H 20/106 248/641 |
| 7,390,231 | B1 * | 6/2008 | Pelini | .................... | B63H 21/14 440/61 E |
| 7,416,459 | B1 * | 8/2008 | Pelini | .................. | B63H 20/106 440/61 R |
| 7,721,552 | B2 | 6/2010 | Pelini | | |
| 7,731,552 | B1 * | 6/2010 | Pelini | .................... | B63H 20/06 440/53 |
| 8,210,886 | B1 * | 7/2012 | Pelini | .................... | A01K 97/02 440/53 |
| 8,216,009 | B1 | 7/2012 | Pelini | | |
| 8,535,105 | B1 * | 9/2013 | Pelini | .................... | B63H 20/02 440/61 E |
| 8,657,637 | B1 * | 2/2014 | Pelini | .................. | B63H 20/106 440/53 |
| 8,801,479 | B1 * | 8/2014 | Quail | .................. | B63H 20/106 440/53 |
| 8,882,551 | B1 * | 11/2014 | Quail | .................. | B63H 20/106 440/53 |
| 9,004,962 | B1 * | 4/2015 | Pelini | .................... | B63H 20/10 440/61 D |
| 9,284,031 | B1 * | 3/2016 | Pelini | .................... | B63H 20/06 |
| 2009/0142973 | A1 * | 6/2009 | Witte | .................. | B63H 20/106 440/53 |

(Continued)

*Primary Examiner* — Muhammad Ijaz (74) *Attorney, Agent, or Firm* — Edward P. Dutkiewicz (57) ABSTRACT

A jack plate has a pair of transom mounting brackets and a pair of slide plate holders. There is a slide plate holder lower cross member and a pivot pin. The pivot pin rotatably couples the transom mounting brackets and the slide plate holders. There is a slide plate and a single unit hydraulic lifting assembly. The hydraulic lifting assembly is coupled to the lower cross member at a location right of the centerline of the lower cross member.

6 Claims, 5 Drawing Sheets

(56) References Cited

U.S. PATENT DOCUMENTS

2014/0030939 A1* 1/2014 Kanno ................. B63H 20/10
440/53

* cited by examiner

BREAKAWAY AND HYDRAULIC LIFT JACK PLATE

BACKGROUND OF THE INVENTION

Rule 1.78 (F) (1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

CLAIM OF PRIORITY

This application is a continuation in part of U.S. patent application Ser. No. 15/820,066, filed on Nov. 21, 2017 and of U.S. patent application Ser. No. 15/858,766, filed on Dec. 29, 2017. The applicant claims the priority of the above identified patent applications as to the parts of each of those applications which are included and claimed in the current application.

FIELD OF THE INVENTION

The present invention relates to a breakaway and hydraulic lift jack plate and more particularly pertains to a device that allows a jack plate to both lift and rotate.

DESCRIPTION OF THE PRIOR ART

The use of jack plates for lifting outboard motors is known in the prior art. More specifically, jack plates for lifting outboard motors previously devised and utilized for the purpose of changing the depth of the motor while underway are known to consist basically of familiar, expected, and obvious structural configurations, notwithstanding the number of designs encompassed by the prior art, which has been developed for the fulfillment of countless objectives and requirements.

While the prior art devices fulfill their respective, particular objectives and requirements, the prior art does not describe breakaway and hydraulic lift jack plate that allows a user to both lift a jack plate, and have a function of the jack plate that allows the outboard engine and plate to be rotated rearward, so as to pass over submerged articles, or articles floating on the surface of the water. The described breakaway and hydraulic lift jack plate is a device that allows an outboard engine to be both lifted and rotated while a boat is underway.

In this respect, the breakaway and hydraulic lift jack plate, according to the present invention, substantially departs from the conventional concepts and designs of the prior art, and in doing so provides an apparatus primarily developed for the purpose of allowing a jack plate to both lift and rotate while underway.

Therefore, it can be appreciated that there exists a continuing need for a new and improved breakaway and hydraulic lift jack plate which can be used to both lift and rotate an outboard motor while the boat is underway. In this regard, the present invention substantially fulfills this need.

SUMMARY OF THE INVENTION

In view of the foregoing disadvantages inherent in the known types of jack plates for lifting outboard motors, now present in the prior art, the present invention provides an improved breakaway and hydraulic lift jack plate. As such, the general purpose of the present invention, which will be described subsequently in greater detail, is to provide a new and improved breakaway and hydraulic lift jack plate which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

By adjacent to a structure is meant that the location is near the identified structure.

To attain this, the present invention essentially comprises a breakaway and hydraulic lift jack plate as is herein described. The breakaway and hydraulic lift jack plate comprises several components, in combination There is a pair of mirror image transom mounting brackets. The pair of mirror image transom brackets being a right transom mounting bracket and a left transom mounting bracket. Each transom mounting bracket has an upper end and lower end. Each transom mounting bracket has a forward transom leg which is configured to be attached to a boat transom. Each transom mounting bracket has a rearwardly directed leg. The forward transom leg and the rearwardly directed leg each being oriented at right angles to each other. The forward transom leg has a first length, and the rearwardly directed leg has a second length. The first length is greater than the second length. The forward leg has a thickness, with a forward surface and a rearward surface. The forward leg has a plurality of transom mounting bolt apertures there through. Each forward leg has a pair of cross member support bolt holes there through. Each rearwardly directed leg of each transom mounting bracket has a pivot pin aperture located near the upper end of each transom mounting bracket. Each rearwardly directed leg of each transom mounting bracket has a first arcuate slot there through. Each rearwardly directed leg of each transom mounting bracket has a second arcuate slot bolt hole there through. Each rearwardly directed leg of each transom mounting bracket has a position locking pin hole there through, with the position locking pin hole of each transom mounting bracket rearwardly directed leg having an associated position locking pin.

There is a transom mounting bracket cross member support having a generally rectilinear configuration. The transom mounting bracket cross member support has a right end portion and a left end portion. The right end portion and the left end portion each have a stepped configuration, forming a recess therein. Each end portion of the transom mounting bracket cross member support has a pair of threaded bolt holes there through. Each transom mounting bracket cross member support threaded bolt hole has an associated lower transom mounting bracket cross member support bolt.

There is a pair of slide plate holders being a right slide plate holder and a left slide plate holder. Each of the slide plate holders is a mirror images of the other. Each slide plate holder has an upper end, a lower end, a forward portion, a rearward portion, an outward surface, and an inward surface. The slide plate holders each have a downward orientation end a tilted orientation. The forward portion upper end of each slide plate holder has a pivot pin aperture there through. The forward portion upper end of each slide plate holder has a first arcuate slot bolt hole there through, with an associated bolt and nut. The forward portion upper end of each slide plate holder has a second arcuate slot there through, with an associated bolt and nut. The second arcuate slot is longer than the first arcuate slot. The forward portion upper end of each slide plate holder has an upper cross member bolt hole there through, with an associated bolt. The lower end of the forward portion of each slide plate holder has slide plate holder lower cross member bolt hole there through. The rearward portion of each slide plate holder has a generally C-shaped configuration with a slide plate groove being located in the inward surface of each rearward portion of each slide plate holder. The rearward portion of each slide plate holder has a treaded grease fitting aperture, with a grease fitting threadedly coupled thereto. Each grease fitting aperture is in communication with the slide plate groove. Each slide plate holder rearward portion groove has a groove insert located therein.

There is a slide plate holder upper cross member having generally rectilinear configuration with a right end, a left end, and a length there between. The length of the upper cross member having a centerline. The right end and the left end of the slide plate holder upper cross member each have a threaded bolt hole there in, with an associated bolt. The bolt fixedly couples the slide plate holder upper cross member with each of the slide plate holders. The upper cross member has a threaded travel stop bolt hole there in, with an associated travel stop. The travel stop has a generally rectilinear configuration with a forward end, a rearward end, and a length there between. The forward end of the travel stop has a bolt hole there through, with an associated travel stop bolt. The travel stop bolt fixedly couples the travel stop to the slide plate holder upper cross member.

There is a slide plate holder lower cross member having a generally rectilinear configuration with a right end, a left end, and a central portion having a centerline, which is equidistant from the right end and the left end of the slidp late pholder lowe cross member. The slide plate holder lower cross member also has a forward surface, a rearward surface, a top surface, and a bottom surface. The right end of the slide plate holder lower cross member and the left end of the slide plate holder lower cross member each have a threaded aperture therein. Each end of the slide plate holder lower cross member has an associated bolt. The associated bolt of the slide plate holder lower cross member fixedly couples each slide plate holder to the slide plate holder lower cross member. The slide plate holder lower cross member has a hydraulic reservoir mounting bolt hole there through, with the bolt hole being located to the right of the centerline of the slide plate holder lower cross member.

There is a pivot pin. The pivot pin has a generally round solid tubular configuration, with opposing threaded ends. Each threaded end has a grease passageway therein. Each pivot pin threaded end has an associated nut. Each pivot pin has a grease zerk therein. The pivot pin rotatably couples the transom mounting brackets and the slide plate assembly.

Thee is a slide plate. The slide plate has a generally rectilinear configuration, with a rearward surface, a forward surface, and an edge there between. The edge comprises a right edge, a left edge, a top edge, and a bottom edge. The slide plate has a right side portion, and a left side portion. The slide plate has a central portion which is between the left side portion of the slide plate and the right side portion of the slide plate. The central portion of the slide plate has a centerline which is equidistant from the right edge and the left edge and runs from the top edge to the bottom edge. The slide plate right edge and slide plate left edge each have a step therein. The slide plate has a plurality of motor mounting bolt holes there through. The slide plate has a pair of lifting ram bracket mounting bolt holes there through, with the lifting ram bracket mounting bolt holes being generally about the centerline of the slide plate, near the upper surface of the slide plate.

There is a lifting hydraulic cylinder ram bracket. The lifting hydraulic cylinder ram bracket has a generally C-shaped configuration, with a rearward mounting portion and a pair of forwardly oriented tabs. The rearward mounting portion of the lifting ram bracket has a pair of rearward mounting portion bolt holes there through, with a pair of associated bolts. The rearward mounting portion bolts fixedly couples the lifting ram bracket to the central portion of the slide plate. The forward oriented tabs of the lifting ram bracket each have a lifting hydraulic ram pin hole there through, with an associated lifting hydraulic ram pin.

Lastly, there is a single unit lifting hydraulic assembly. The single unit lifting hydraulic assembly comprises a cylinder with an extendable ram, a motor with an associated hydraulic pump and a hydraulic fluid reservoir. The lifting hydraulic cylinder has a generally flat lower extent, with the flat lower extent of the single unit lifting hydraulic cylinder resting on the slide plate holder lower cross member. The lifting hydraulic cylinder has a right extent and a left extent. The lifting hydraulic cylinder ram has a distal end, with the distal end of the lifting hydraulic cylinder ram having a pin hole there through. The lifting hydraulic cylinder ram is coupled to the lifting hydraulic cylinder ram bracket. The single unit lifting hydraulic assembly motor and hydraulic fluid reservoir are located to the right side of the right extent of the hydraulic cylinder. The hydraulic fluid reservoir has a lower mounting tab. The lower mounting tab of the hydraulic fluid reservoir has a bolt hole there through, with an associated bolt. The lower mounting tab of the hydraulic fluid reservoir bolt fixedly couples the hydraulic fluid reservoir tab to the slide plate holder lower cross member to the right of the centerline of the slide plate holder lower cross member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components sets forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved breakaway and hydraulic lift jack plate which has all of the advantages of the prior art jack plates, for lifting outboard motors, and none of the disadvantages.

It is another object of the present invention to provide a new and improved breakaway and hydraulic lift jack plate which may be easily and efficiently manufactured and marketed.

It is further object of the present invention to provide a new and improved breakaway and hydraulic lift jack plate which is of durable and reliable constructions.

An even further object of the present invention is to provide a new and improved breakaway and hydraulic lift jack plate which is susceptible of a low cost of manufacture with regard to both materials and labor, and which accordingly is then susceptible of low prices of sale to the consuming public, thereby making such breakaway and hydraulic lift jack plate economically available to the buying public.

Even still another object of the present invention is to provide a breakaway and hydraulic lift jack plate that allows a jack plate to both lifted and rotated while a boat is underway.

Lastly, it is an object of the present invention to provide a breakaway and hydraulic lift jack plate has a pair of transom mounting brackets and a pair of slide plate holders. There is a slide plate holder lower cross member and a pivot pin. The pivot pin rotatably couples the transom mounting brackets and the slide plate holders. There is a slide plate and a single unit hydraulic lifting assembly. The hydraulic lifting assembly is coupled to the lower cross member at a location right of the centerline of the lower cross member.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
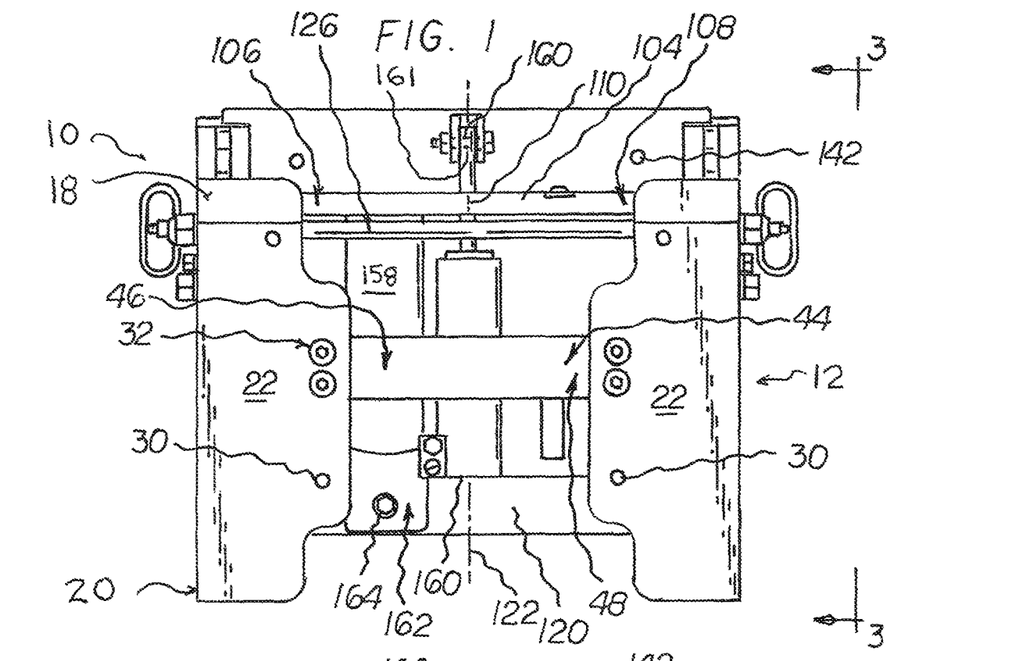
FIG. 1 is front elevational view of the jack plate, showing the transom side of the device.
Figure 2:
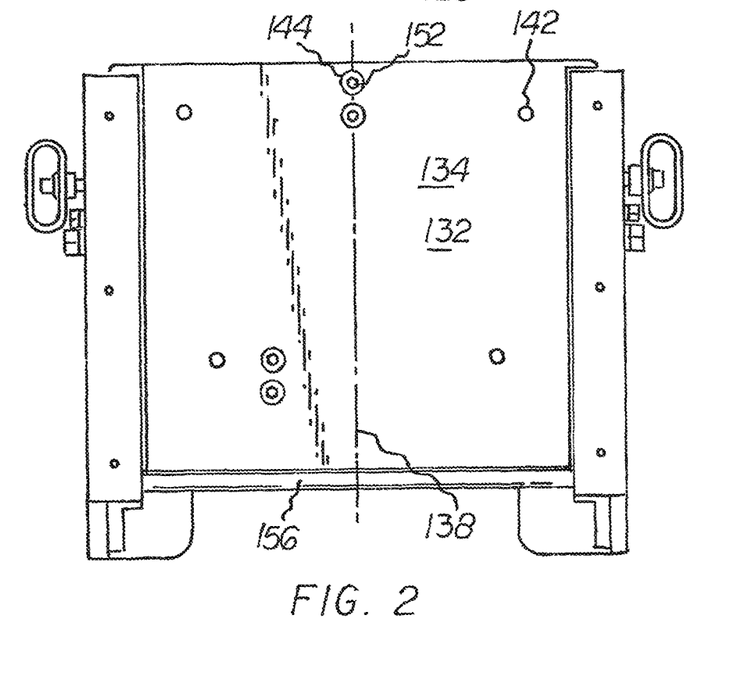
FIG. 2 is a rear elevational view of the jack plate showing the motor side of the device.

With reference now to the drawings, and in particular to FIG. 1 thereof, the preferred embodiment of the new and improved breakaway and hydraulic lift jack plate embodying the principles and concepts of the present invention and generally designated by the reference numeral 10 will be described.

The present invention, the breakaway and hydraulic lift jack plate 10 is comprised of a plurality of components. Such components in their broadest context include a pair of transom mounts, a pair of slide plate holders, a slide plate and a hydraulic assembly to raise and lower the slide plate, to which an outboard motor is attached. Such components are individually configured and correlated with respect to each other so as to attain the desired objective.

A breakaway and hydraulic lift jack plate 10 is herein described. The breakaway and hydraulic lift jack plate comprises several components, in combination.

Figure 3:
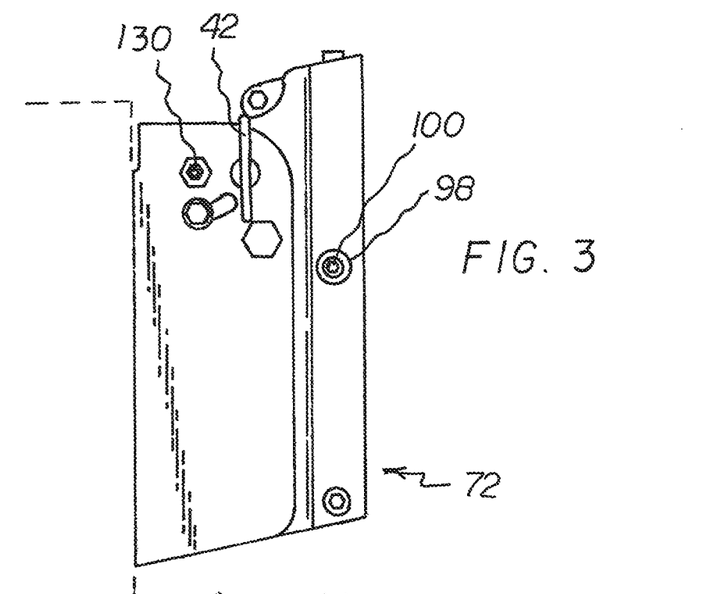
FIG. 3 is a view taken along line 3-3 of FIG. 1. Note that the jack plate is in the downward orientation, in which an attached outboard motor propeller would be generally parallel with the transom of a boat which is depicted with broken lines.
Figure 4:
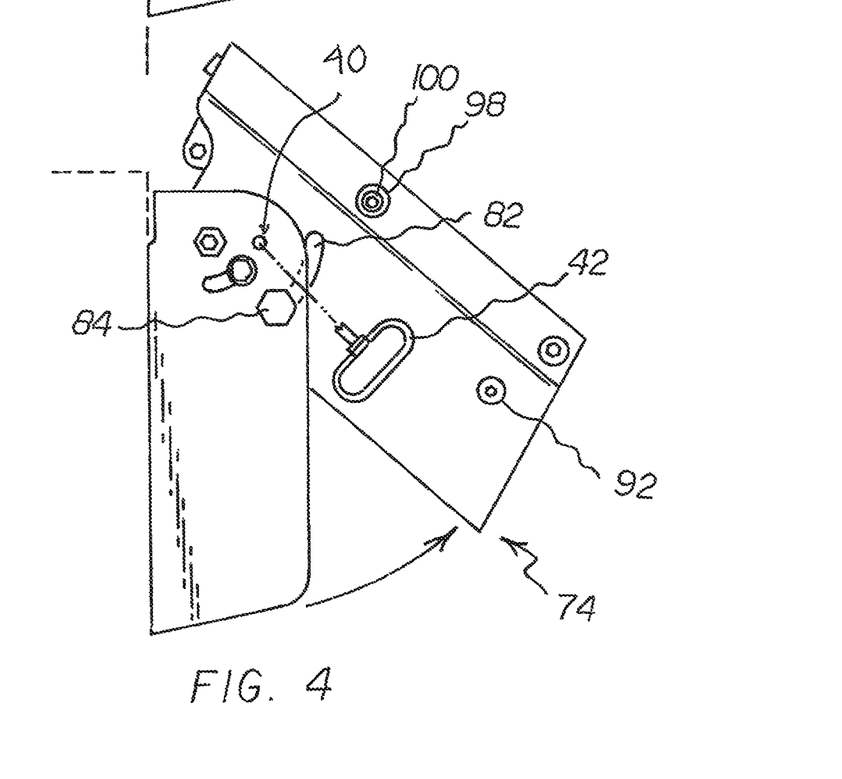
FIG. 4 is a view of the jack plate in a rearward orientation, such as would occur if the outboard motor would strike a submerged object. The rotation allows the motor to move over any such submerged object.
Figure 5:
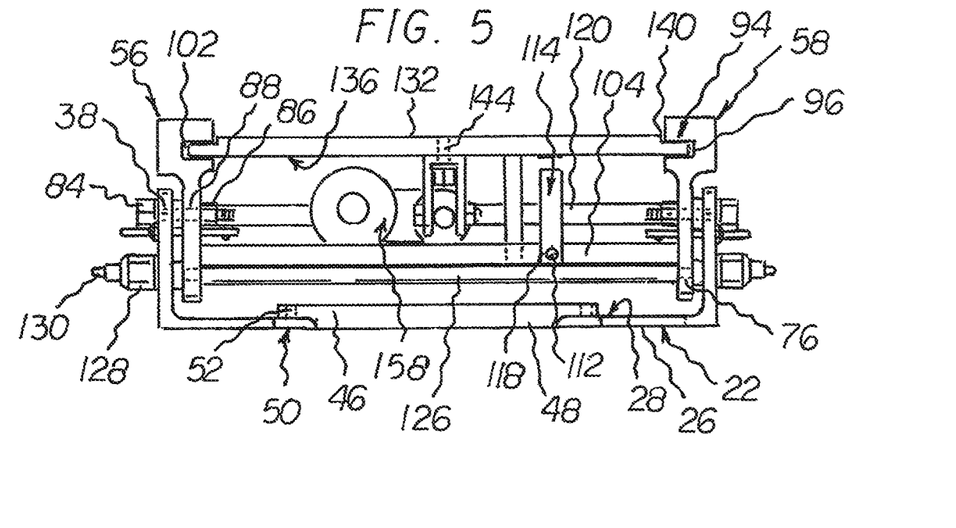
FIG. 5 is a top plan view of the device.
Figure 6:
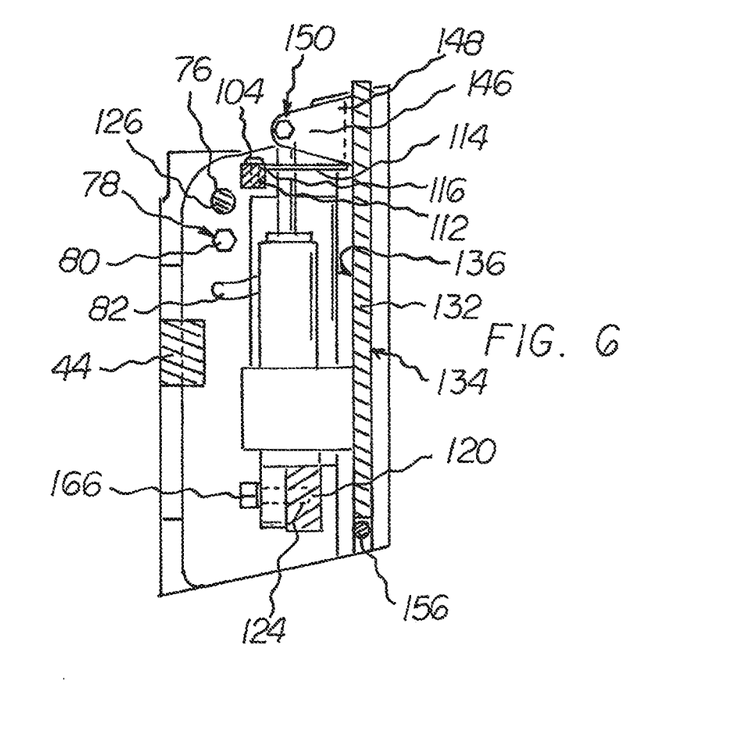
FIG. 6 is a side elevational cross section of the jack plate.
Figure 7:
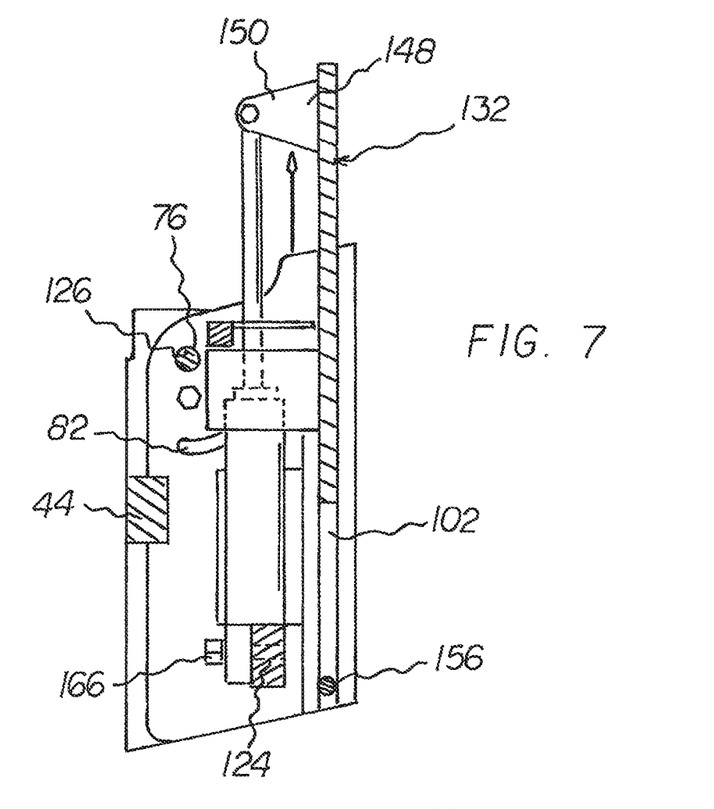
FIG. 7 is a side elevational cross section of the jack plate with the slide plate in a lifted orientation. Note that the hydraulic ram is extended.
Figure 8:
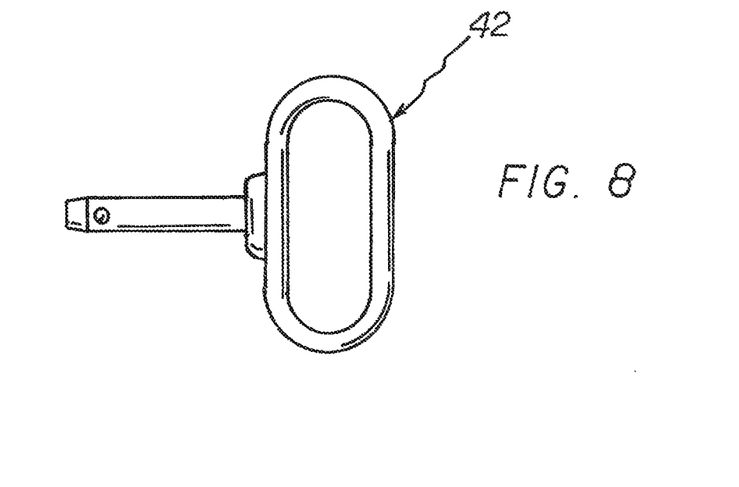
FIG. 8 is a close up view of the position locking pin, which prevents rotation of the outboard motor.
Figure 9:
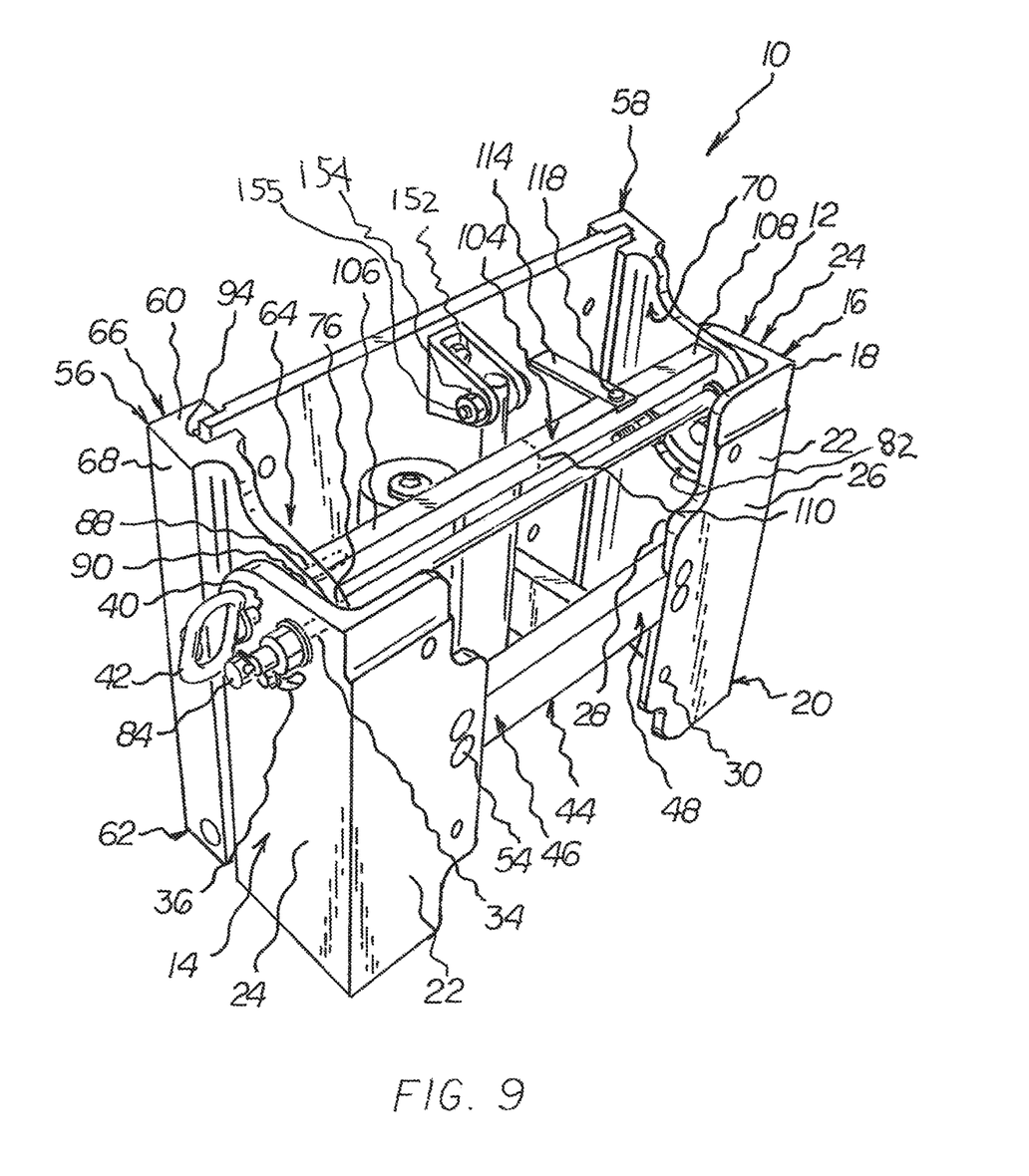
FIG. 9 is a top right perspective view of the breakaway and hydraulic jack plate.

There is a pair of mirror image transom mounting brackets 12. The pair of mirror image transom brackets being a right transom mounting bracket 14 and a left transom mounting bracket 16. Each transom mounting bracket has an upper end 18 and a lower end 20. Each transom mounting bracket has a forward transom leg 22 which is configured to be attached to a boat transom which is shown in broken lines in FIGS. 3 and 4. Each transom mounting bracket has a rearwardly directed leg 24.

In the preferred embodiment the forward transom leg and the rearwardly directed leg each are oriented at right angles to each other, though, the angle between the forward transom leg and the rearwardly directed leg may be between one hundred and twenty degrees and sixty degrees.

The forward transom leg has a first length, and the rearwardly directed leg has a second length. The first length is greater than the second length. The relative lengths of the forward transom leg and the rearwardly directed leg are not critical, and, in other embodiments, the legs may be any length.

The forward leg has a thickness, with a forward surface 26 and a rearward surface 28. The forward leg has a plurality of transom mounting bolt apertures 30 there through. Each forward leg has a pair of cross member support bolt holes 32 there through.

Each rearwardly directed leg of each transom mounting bracket has a pivot pin aperture 34 located near the upper end of each transom mounting bracket. Each rearwardly directed leg of each transom mounting bracket has a first arcuate slot 36 there through. Each rearwardly directed leg of each transom mounting bracket has a second arcuate slot bolt hole 38 there through. Each rearwardly directed leg of each transom mounting bracket has a position locking pin hole 40 there through, with the position locking pin hole of each transom mounting bracket rearwardly directed leg having an associated position locking pin 42.

There is a transom mounting bracket cross member support 44 having a generally rectilinear configuration. The transom mounting bracket cross member support has a aright end portion 46 and a left end portion 48. The right end portion and the left end portion each have a stepped confifiguration, forming a recess 50 therein.

Each end portion of the transom mounting bracket cross member support has a pair of threaded bolt holes 52 there through. Each transom mounting bracket cross member support threaded bolt hole has an associated lower transom mounting bracket cross member support bolt 54.

There is a pair of slide plate holders being a right slide plate holder 56 and a left slide plate holder 58. Each of the slide plate holders is a mirror image of the other. Each slide plate holder has an upper end 60, a lower end 62, a forward portion 64, a rearward portion 66, an outward surface 68, and an inward surface 70. The slide plate holders each have a downward orientation 72 and a tilted orientation 74.

The forward portion upper end of each slide plate holder has a pivot pin aperture 76 there through. The forward portion upper end of each slide plate holder has a first arcuate slot bolt hole 78 there through, with an associated bolt and nut 80. The forward portion upper end of each slide plate holder has a second arcuate slot 82 there through, with an associated bolt 84 and nut 86. The second arcuate slot is longer than the first arcuate slot. The forward portion upper end of each slide plate holder has an upper cross member bolt hole 88 there through, with an associated bolt 90.

The lower end of the forward portion of each slide plate holder has a slide plate holder lower cross member bolt hole 92 there through. Each slide plate holder being pivotably coupled to one of the pair of transom mounting brackets so as to allow rotation of each slide plate holder relative to the pair of transom mounting brackets.

The rearward portion of each slide plate holder has a generally C-shaped configuration 94 with a slide plate groove 96 being located in the inward surface of each rearward portion of each slide plate holder. The rearward portion of each slide plate holder has a treaded grease fitting aperture 98, with a grease fitting 100 threadedly coupled thereto. Each grease fitting aperture is in communication with the slide plate groove. Each slide plate holder rearward portion groove has a groove insert 102 located therein.

There is a slide plate holder upper cross member 104 having a generally rectilinear configuration with a right end 106, a left end 108, and a length there between. The length of the upper cross member has a centerline 110. The right end and the left end of the slide plate holder upper cross member each has a threaded bolt hole there in, with an associated bolt. The bolt fixedly couples the slide plate holder upper cross member with each of the slide plate holders.

The upper cross member has a threaded travel stop bolt hole 112 there in, with an associated travel stop 114. The travel stop has a generally rectilinear configuration with a forward end, a rearward end, and a length there between. The forward end of the travel stop has a bolt hole 116 there through, with an associated travel stop bolt 118. The travel stop bolt fixedly couples the travel stop to the slide plate holder upper cross member.

There is a slide plate holder lower cross member 120 having a generally rectilinear configuration with a right end, a left end, and a central portion having a centerline 122, which is equidistant from the right end and the left end of the slide plate holder lower cross member. The slide plate holder lower cross member also has a forward surface, a rearward surface, a top surface, and a bottom surface. The right end of the slide plate holder lower cross member and the left end of the slide plate holder lower cross member each have a threaded aperture therein. Each end of the slide plate holder lower cross member has an associated bolt. The associated bolt of the slide plate holder lower cross member fixedly couples each slide plate holder to the slide plate holder lower cross member.

The slide plate holder lower cross member has a hydraulic reservoir mounting bolt hole 124 there through, with the bolt hole being located to the right of the centerline of the slide plate holder lower cross member.

There is a pivot pin 126. The pivot pin has a generally round solid tubular configuration, with opposing threaded ends. Each threaded end has a grease passageway therein. Each pivot pin threaded end has an associated nut 128. Each pivot pin has a grease zerk 130 therein. The pivot pin rotatably couples the transom mounting brackets and the slide plate assembly.

Thee is a slide plate 132. The slide plate has a generally rectilinear configuration, with a rearward surface 134, a forward surface 136, and an edge there between. The edge comprises a right edge, a left edge, a top edge, and a bottom edge. The slide plate has a right side portion and a left side portion.

The slide plate has a central portion which is between the left side portion of the slide plate and the right side portion of the slide plate. The central portion of the slide plate has a centerline 138 which is equidistant from the right edge and the left edge and runs from the top edge to the bottom edge.

The slide plate right edge and slide plate left edge each have a step 140 therein. The slide plate has a plurality of motor mounting bolt holes 142 there through. The slide plate has a pair of lifting ram bracket mounting bolt holes 144 there through, with the lifting ram bracket mounting bolt holes being generally about the centerline of the slide plate, near the upper surface of the slide plate.

There is a lifting hydraulic cylinder ram bracket 146. The lifting hydraulic cylinder ram bracket has a generally C-shaped configuration, with a rearward mounting portion 148 and a pair of forwardly oriented tabs 150. The rearward mounting portion of the lifting ram bracket has a pair of rearward mounting portion bolt holes there through, with a pair of associated bolts 152. The rearward mounting portion bolts fixedly couples the lifting ram bracket to the central portion of the slide plate.

The forward oriented tabs of the lifting ram bracket each have a lifting hydraulic ram pin hole 154 there through, with an associated lifting hydraulic ram pin 155.

There is a lower groove cross member 156, which fixedly couples the lower end of each of the slide plate holders and limits the downward travel of the slide plate.

Lastly, there is a single unit lifting hydraulic assembly 158. The single unit lifting hydraulic assembly comprises a cylinder with an extendable ram, a motor with an associated hydraulic pump and a hydraulic fluid reservoir.

The lifting hydraulic cylinder has a generally flat lower extent 160, with the flat lower extent of the single unit lifting hydraulic cylinder resting on the slide plate holder lower cross member. The lifting hydraulic cylinder has a right extent and a left extent. The lifting hydraulic cylinder ram has a distal end, with the distal end of the lifting hydraulic cylinder ram having a pin hole 161 there through. The lifting hydraulic cylinder ram is coupled to the lifting hydraulic cylinder ram bracket by a bolt.

The single unit lifting hydraulic assembly motor and hydraulic fluid reservoir are located to the right side of the right extent of the hydraulic cylinder. The hydraulic fluid reservoir has a lower mounting tab 162. The lower mounting tab of the hydraulic fluid reservoir has a bolt hole 164 there through, with an associated bolt 166. The lower mounting tab of the hydraulic fluid reservoir bolt fixedly couples the hydraulic fluid reservoir tab to the slide plate holder lower cross member to the right of the centerline of the slide plate holder lower cross member.

In operation, the breakaway and hydraulic jack plate is attached to a boat transom. The transom mounting bracket cross member support helps to maintain the orientation of the brackets. The slide plate holders are rotatably coupled to the transom mounting brackets. The slide plate holders have three cross supports which fix the slide plate holders together. The slide plate is held within the slide plate holders and the hydraulic unit lifts and lowers the slide plate. It should be noted that the hydraulic unit rests on the center of a support, but is bolted to the right of center of the support.

In the event that the outboard motor strikes a submerged object, the slide plate holders can rotate to move the motor over the object. The forward thrust of the propeller will reposition the slide plate holders into a downward orientation when the motor clears the submerged object. The use of a locking pin defeats the rotational capabilities of the device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A breakaway and hydraulic lift jack plate comprising a plurality of components, in combination:
    a pair of transom mounting brackets, each of the transom mounting brackets being identical, with the transom mounting brackets being reversely arranged in comparison with one another, the transom mounting brackets being a right transom mounting bracket and a left transom mounting bracket with each said transom mounting bracket having an upper end and a lower end, with each said transom mounting bracket of said pair of transom mounting brackets having a forward transom leg configured to be attached to a boat transom, and a rearwardly directed leg, the forward transom leg having a thickness, with a forward transom leg forward surface and a forward transom leg rearward surface, the forward transom leg having a plurality of transom mounting bolt apertures there through, each said forward transom leg having a pair of cross member support bolt holes there through, each said rearwardly directed leg of each said transom mounting bracket of said pair of transom mounting brackets having a pivot pin aperture located near the upper end of each said transom mounting bracket, each of said rearwardly directed leg of each of said transom mounting bracket having a first arcuate slot there through, the forward transom leg having a first length, and the rearwardly directed leg having a second length;
    a transom mounting bracket cross member support having a generally rectilinear configuration, with a right end portion and a left end portion
    a pair of slide plate holders being a right slide plate holder and a left slide plate holder, each said slide plate holder having an upper end and a lower end and a forward portion which includes the upper end, in part, and a rearward portion and an outward surface and an inward surface, the slide plate holders being rotatable so that each of the slide plate holders have a downward orientation and a tilted orientation, each said slide plate holder being pivotably coupled to one of the pair of transom mounting brackets, the rearward portion of each said slide plate holder having a generally C-shaped configuration with a slide plate groove being located in the inward surface of each of said rearward portion of each said slide plate holder, the upper end forward portion of each said slide plate holder having a first arcuate slot bolt hole there through with an associated bolt and nut;
    a slide plate holder upper cross member having a generally rectilinear configuration with a right end and a left end and a length there between, the slide plate holder upper cross member being fixedly coupled to each of the slide plate holders, each of the slide plate holders being identical, with the slide plate holders being reversely arranged in comparison with one another;
    a slide plate holder lower cross member having a generally rectilinear configuration with a right end and a left end and a length, the slide plate holder lower cross member being fixedly coupled to each of the slide plate holders, the slide plate holder lower cross member having a central portion with a center line which is equidistant from the left end and the right end of the slide plate holder lower cross member, the slide plate holder lower cross member also having a forward surface and a rearward surface and a top surface and a bottom surface;
    a pivot pin having a generally round solid tubular configuration with opposing threaded ends, the pivot pin rotatably couples the transom mounting brackets and the slide plate holders;
    a slide plate having a generally rectilinear configuration, with a rearward surface and a forward surface and an edge there between, the edge comprising a right edge and a left edge and a top edge and a bottom edge, the slide plate having a right side portion and a left side portion, the slide plate being slidably held by each of the slide plate holders, the slide plate having a plurality of motor mounting bolt holes there through;
    a single unit lifting hydraulic assembly comprising a lifting hydraulic cylinder with an extendable lifting hydraulic cylinder ram, a motor with an associated hydraulic pump and a hydraulic fluid reservoir, the lifting hydraulic cylinder having a right extent and a left extent, the lifting hydraulic cylinder ram having a distal end, the single unit lifting hydraulic assembly being coupled to the slide plate, the lifting hydraulic cylinder having a generally flat lower extent; and
    a lifting hydraulic cylinder ram bracket having a generally C-shaped configuration with a rearward mounting portion and a pair of forwardly oriented tabs, the rearward mounting portion of the lifting hydraulic cylinder ram bracket having a pair of rearward mounting portion bolt holes there through with a pair of associated lifting ram bracket rearward mounting portion bolts.

2. The breakaway and hydraulic lift jack plate as described in claim 1 with the breakaway and hydraulic lift jack plate further comprising:

the forward transom leg of the transom mounting brackets and the rearward leg of the transom mounting brackets each being oriented at right angles to each other, each said rearwardly directed leg of each said transom mounting bracket having a second arcuate slot bolt hole there through, each said end portion of the transom mounting bracket cross member support having a pair of threaded bolt holes there through, each of said threaded bolt holes of each of said end portions of said transom mounting bracket cross member support having an associated lower transom mounting bracket cross member support bolt;

the forward portion upper end of each said slide plate holder having a second arcuate slot there through with an associated bolt and nut;

the forward portion upper end of each said slide plate holder having an upper cross member bolt hole there through with an associated bolt;

the right end and the left end of the slide plate holder upper cross member each having a threaded bolt hole there in, with an associated bolt, the bolt fixedly coupling the slide plate holder upper cross member with each of the slide plate holders;

the right end of the slide plate holder lower cross member and the left end of the slide plate holder lower cross member each having a threaded aperture therein, each end of the slide plate holder lower cross member having an associated slide plate holder lower cross member bolt, with the associated slide plate holder lower cross member bolt of the slide plate holder lower cross member fixedly coupling each said slide plate holder to the slide plate holder lower cross member;

each of the threaded ends of each of the pivot pins having a grease passageway therein, with an associated grease zerk, with each of the threaded ends of each of the pivot pins having an associated nut;

the slide plate having a pair of lifting ram bracket mounting bolt holes there through, the slide plate having a central portion which is between the left side portion of the slide plate and the right side portion of the slide plate with the central portion of the slide plate having a centerline which is equidistant from the right edge and the left edge and runs from the top edge of the slide plate to the bottom edge of the slide plate;

the rearward mounting portion bolts fixedly coupling the lifting ram bracket to the slide plate;

the flat lower extent of the single unit lifting hydraulic cylinder resting on about the centerline of the slide plate holder lower cross member; and the distal end of the lifting hydraulic cylinder ram having a pin hole there through.

3. The breakaway and hydraulic lift jack plate as described in claim 2 with the breakaway and hydraulic lift jack plate further comprising:

the forward portion upper end of each said slide plate holder having a pivot pin aperture there through;

the transom mounting bracket cross member support right end portion and the transom mounting bracket cross member support left end portion each having a stepped configuration, forming a recess therein;

the lower end of the forward portion of each said slide plate holder having a slide plate holder lower cross member bolt hole there through, the rearward portion of each slide plate holder having a treaded grease fitting aperture, with a grease fitting threadedly coupled there to;

the central portion of the slide plate holder lower cross member having a hydraulic reservoir mounting bolt hole there through with the hydraulic reservoir mounting bolt hole being located to the right of the centerline of the slide plate holder lower cross member;

the pivot pin rotatably coupling the transom mounting brackets and the slide plate holders;

the slide plate right edge and left edge each having a step therein, with the lifting ram bracket mounting bolt holes being generally located at about the centerline of the slide plate near the upper surface of the slide plate;

the forward oriented tabs of the lifting ram bracket each have a lifting hydraulic ram pin hole there through with an associated lifting hydraulic ram pin; and the lifting hydraulic cylinder ram being coupled to the lifting hydraulic cylinder ram bracket.

4. The breakaway and hydraulic lift jack plate as described in claim 3 with the breakaway and hydraulic lift jack plate further comprising:

the forward transom leg of the transom mounting bracket first length being greater than the rearward leg of the transom mounting bracket second length, each said rearwardly directed leg of each said transom mounting bracket having a position locking pin hole there through with the position locking pin hole of each said transom mounting bracket rearwardly directed leg having an associated position locking pin;

each said slide plate holder second arcuate slot being longer than the first arcuate slot of the rearwardly directed leg of each said transom mounting bracket;

each said threaded slide plate holder grease fitting aperture is in communication with the slide plate groove, each said slide plate holder rearward portion groove having a groove insert located therein;

the slide plate holder upper cross member having a threaded travel stop bolt hole there in with an associated travel stop; and the single unit lifting hydraulic assembly motor and the single unit lifting hydraulic assembly hydraulic fluid reservoir being located to the right side of the right extent of the hydraulic cylinder.

5. The breakaway and hydraulic lift jack plate as described in claim 4 with the breakaway and hydraulic lift jack plate further comprising:

the slide plate holder upper cross member travel stop having a generally rectilinear configuration with a forward end and a rearward end and a length there between, the forward end of the travel stop having a bolt hole there through with an associated travel stop bolt, the travel stop bolt fixedly coupling the travel stop to the slide plate holder upper cross member;

a lower groove cross member; and the hydraulic fluid reservoir having a lower mounting tab with the lower mounting tab having a bolt hole there through with an associated bolt, the bolt fixedly coupling the hydraulic fluid reservoir tab to the slide plate holder lower cross member.

6. A breakaway and hydraulic lift jack plate comprising a plurality of components, in combination:

a pair of transom mounting brackets with the transom mounting brackets being identical, with the transom mounting brackets being reversely arranged in comparison with one another, being a right transom mounting bracket and a left transom mounting bracket with each said transom mounting bracket having an upper end and a lower end, with each said transom mounting bracket having a forward transom leg configured to be attached to a boat transom, and a rearwardly directed leg, the forward transom leg having a thickness, with a forward surface and a rearward surface, the forward transom leg having a plurality of transom mounting bolt apertures there through;

a pair of slide plate holders being a right slide plate holder and a left slide plate holder, each of the slide plate holders being identical, with the slide plate holders being reversely arranged in comparison with one another, the slide plate holders each having a downward orientation and a tilted orientation, the slide plate holders being rotatably coupled to each of the transom mounting brackets;

a slide plate holder lower cross member having a generally rectilinear configuration with a right end and a left end and a length, the slide plate holder lower cross member having a centerline being equidistant from the right end and the left end of the lower cross member, the slide plate holder lower cross member fixedly coupling each of the slide plate holders;

a lower groove cross member;

a slide plate holder upper cross member having a generally rectilinear configuration with a right end and a left end and a length there between, the slide plate holder upper cross member fixedly coupling each of the slide plate holders;

a pivot pin having a generally round solid tubular configuration with opposing threaded ends, the pivot pin rotatably coupling the slide plate holders and the transom mounting brackets;

a slide plate having a generally rectilinear configuration; and a single unit lifting hydraulic assembly comprising a cylinder with an extendable ram, a motor with an associated hydraulic pump and a hydraulic fluid reservoir, the lifting hydraulic cylinder having a right extent and a left extent, the lifting hydraulic cylinder ram having a distal end, the hydraulic cylinder having a generally flat lower extent, the hydraulic fluid reservoir having a downward projecting tab with a bolt hole there through, the hydraulic fluid reservoir being coupled to the lower cross member at a location right of the centerline of the lower cross member.

\* \* \* \* \*